United States Patent [19]

Lucey

[11] Patent Number: 5,134,175

[45] Date of Patent: Jul. 28, 1992

[54] CURABLE COMPOSITION FOR ELECTRICAL AND ELECTRONIC COMPONENTS

[76] Inventor: Michael Lucey, 25 Homer Ave., Cambridge, Mass. 02138

[21] Appl. No.: 620,378

[22] Filed: Nov. 29, 1990

Related U.S. Application Data

[63] Continuation of Ser. No. 133,497, Dec. 16, 1987, abandoned.

[51] Int. Cl.$^5$ .............................. C08K 3/00; C08F 2/46
[52] U.S. Cl. ..................................... 522/76; 522/77; 522/79; 522/81; 522/83; 522/103
[58] Field of Search ................ 522/81, 79, 76, 77, 522/83, 103

[56] References Cited

U.S. PATENT DOCUMENTS

| | | | |
|---|---|---|---|
| 2,952,595 | 9/1960 | Jordan et al. | 522/77 |
| 3,896,014 | 7/1975 | Rosenberg | 522/30 |
| 4,052,280 | 10/1977 | McGinnis | 522/67 |
| 4,205,018 | 5/1980 | Nagasawa et al. | 522/92 |
| 4,282,269 | 8/1981 | Lucey | 522/96 |
| 4,315,081 | 2/1982 | Kobayashi | 524/141 |
| 4,336,311 | 6/1982 | Lucey | 522/96 |
| 4,349,605 | 9/1982 | Biggs | 522/81 |
| 4,390,401 | 6/1983 | Costanza | 522/181 |
| 4,407,984 | 10/1983 | Ratcliffe et al. | 522/83 |
| 4,459,193 | 7/1984 | Ratcliffe et al. | 522/92 |
| 4,510,175 | 4/1985 | Burn | 427/79 |
| 4,514,468 | 4/1985 | Lucey | 428/458 |
| 4,537,940 | 8/1985 | Omura | 522/171 |
| 4,603,158 | 7/1986 | Markham | 524/141 |

FOREIGN PATENT DOCUMENTS 147846 11/1981 Japan .

OTHER PUBLICATIONS

Derwent Abstract 81-95964D/52, Dec. 1981 for Matsushita.

*Primary Examiner*—Marion E. McCamish
*Assistant Examiner*—Mark A. Chapman
*Attorney, Agent, or Firm*—Wolf, Greenfield & Sacks

[57] ABSTRACT

Actinic radiation curable composition suitable for use in coating electronic components and as a printing ink comprising as the essential components:
(a) a prepolymer selected from the group consisting of monofunctional vinyl resins and multifunctional vinyl resins;
(b) a monomer selected from the group consisting of monofunctional vinyl monomers and multifunctional vinyl monomers;
(c) a photoinitiator;
(d) a filler; and
(e) at least one surface active agent having a molecular weight greater than about 227;

wherein one of the surface active agent or the filler has a pH greater than or equal to 7 and the other of the surface active agent or the filler has a pH less than or equal to 7 such that dispersion of the filler in the composition is enhanced and relatively high loading of filler in the composition is obtainable.

24 Claims, No Drawings

CURABLE COMPOSITION FOR ELECTRICAL AND ELECTRONIC COMPONENTS

This application is a continuation of application Ser. No. 07/133,497, filed Dec. 16, 1987, now abandoned.

BACKGROUND OF THE INVENTION

1. Field of the Invention

This invention relates to a UV, or electron beam, curable coating composition suitable for use in providing a protective barrier coating on electrical and electronic components and as an ink for printing on various substrates.

2. Description of the Prior Art

Electrical and electronic components, e.g., thick and thin film hybrid circuits, tantalum capacitors, axial leaded film-foil capacitors, ceramic disk and tubular capacitors, electrolytic capacitors, radial film foil capacitors, resistors, stacked film capacitors, and related electrical and electronic components must be, in general, provided with a protective coating. Such a coating must provide ease in handling and be capable of providing the electrical an electronic component certain desired physical, thermal, electrical insulation and moisture resistance properties. The variety of different shapes o electrical and electronic components that are provided with a protective coating present certain unique problems. The composition used must not only provide the desired properties mentioned as a protective coating, it must also be one that can be applied to the component involved using the most suitable coating procedure. Moreover, as with any coating composition, it is desired that the protective coating be obtained in the most economical manner without compromise to the various properties desired.

In general, the protective barrier coating on an electrical or electronic component is provided by first coating the electrical and electronic component, or a portion thereof, with a resinous composition, and then heating the coated component at a suitable temperature and for a suitable length of time whereby the coating composition is cured and adheres to the underlying electrical or electronic component. The post curing step of the coating operation may be shortened in some cases by preheating the component before application of the resinous coating composition. The coating composition used may be, in some cases, either a solid, powdery composition, or, in other cases, one that is liquid, depending somewhat upon the substrate being coated. The use of such a coating composition and procedure is, however, attendant with certain disadvantages. In particular, where the resinous composition is solvent based, this creates environmental considerations. Moreover, such compositions sometimes result in the creation of bubbles and pin holes in the coating layer created by entrapped air during the curing cycle. Furthermore, conventional thermal curing of resinous coating compositions is not only time consuming but also costly in terms of energy consumption, space, equipment, coating material usage and personnel.

Printing and screening inks are applied to a wide variety of substrates, e.g., metals, metal alloys, paper, thermoplastic and thermosetting resin layers, etc. Nevertheless, particular problems are presented when the substrate is heat sensitive. The ink composition applied must be capable of being cured under conditions not damaging to the substrate.

The ultraviolet curing of coating compositions has been known now for sometime. Exemplary of the prior art are U.S. Pat. Nos. 3,896,014; 4,349,605; and 4,390,401. U.S. Pat. No. 3,896,014 discloses liquid nail lacquer compositions which comprise as the essential components a polyene, a polythiol, a photocuring rate accelerator and, as disclosed by the patentee, a surfactant from a particular class. Among the preferred surfactants are sorbitan sesquioleate, sorbitan dioleate, sorbitan trioleate, pentaerythritol dioleate and pentaerythritol trioleate. Other surfactants found operative in the composition disclosed, but deemed by the patentee to be somewhat less efficient, include alkenyldimethylethyl ammonium bromide; di"coco"dimethyl ammonium chloride quaternary imidazolinium salt (from stearic acid); qlyceryl monooleate; glyceryl dioleate; glyceryl trioleate and polyglyceryl ester of oleic acid. Nevertheless, a host of other surfactants were discovered to be inoperative in the invention due to the fact that they were either insoluble in the composition, or they did not improve the wettability of the composition as it tended to "bead" when applied to the surface of the nail.

In U.S. Pat. No. 4,349,605, there are disclosed radiation curable polymeric compositions having flame retardant properties which comprise copolymers of ethylene and a comonomer which may be vinyl ester or an acrylate or a methacrylate, a hydrated inorganic filler, an alkoxy silane, and a lubricant comprising lauric acid and ethylene-bis-stearamide. The filler can, if desired, be silane treated, rather than adding the filler and silane separately to the composition. Such polymeric compositions are disclosed to be preferably cured by radiation means, although cross-linking of the polymers can also be achieved by chemical crosslinking or thermal crosslinking. According to the patentees, such polymeric compositions will hold very large amounts of filler and still provide high flexibility and a high degree of crosslinking. This is deemed by the patentees to be quite surprising as high flexibility and high crosslinking are generally incompatible, as are high crosslinking and high filler loading (which implies low crosslinkable polymer content). In compositions used for coating, e.g., extruding onto electrical wire and cables, best results, according to the patentees, are obtained when from 44 to 80% by weight of filler in the composition, or 22 to 59% volume of filler, preferably 50 to 57% by weight of filler in the composition, or 26 to 32% volume of filler are employed.

U.S. Pat. No. 4,390,401 discloses ultraviolet curable coating compositions which comprise polyunsaturated polyacrylates or methacrylates and as a wetting agent and adhesive promoter an acrylate or methacrylate of a polyalkylene oxide derivative of a mono-hydric alkyl-/aryl phenol.

Others, in addition to the patentees in U.S. Pat. No. 4,349,605 have disclosed a pretreated filler in a polymeric composition. Thus, in U.S. Pat. No. 2,952,595, it is disclosed that vinyltri treated filler, e.g. hydrated silide, in amounts from about 11 to 34% by weight of the composition or 10 to 30% vol of filler, enhances the beneficial effect that radiation treatment has on the filled polyethylene. Thus, with such treated fillers the impact strength of the compositions was improved, and the brittle point was lowered, in addition to improved torsional hepteresis.

In Japanese 56147846 (Matsushita Electric Works) there is disclosed a photocurable polyester resin composition for the production of thick sheets which comprises unsaturated polyester resin, a photopolymerization initiator, and an inorganic filler, e.g. calcium carbonate, calcium silicate, titanium oxide, aluminum oxide, talc, clay, alumina, calcium hydroxide, and magnesium carbonate, coated with a surfactant. Those surfactants specifically disclosed are stearic acid, lauric acid, rosin, lignin, and cationic surfactant. According to the abstract, the treated filler is used at 16.6 to 80% by weight of the composition. The surface-treated filler is claimed to permit UV to penetrate the composition to deep inside, allowing production of thick sheets.

None of the prior art of which we are aware, however, provides a composition such as we have invented and disclosed and claim herein.

SUMMARY OF THE INVENTION

This invention, in its basic aspects, is a composition suitable for use in providing a protective coating on a localized area of, or fully encapsulating, an electrical and electronic component and as a printing ink for the imprinting of various substrates. Quite advantageously, when electrical and electronic components are coated with the compositions of the invention, these compositions can be cured with actinic radiation, e.g. ultraviolet or electron beam radiation, rather than thermally, thereby offering substantial cost savings; yet, obtaining superior performance properties comparable to and in some cases better than, coatings which have been cured only thermally. The cost savings result from increased throughput, lower energy consumption, compact automation, reduced staffing, and less coating material usage.

Most advantageously, the compositions of our invention provide superior physical properties and coatings of consistently high quality, even though such compositions comprise a higher loading of filler than compositions known to be used heretofore for such purposes as disclosed herein. The compositions disclosed herein allow rapid transformation of a completely liquid/solids system, using actinic radiation, into a thermoset polymer thereby eliminating pinholes, peeling, bubbles, while providing a more adequate surface topography, i.e., reducing the amount of material that coats the lead wires.

These advantages and others are provided by the compositions disclosed herein which, in the more basic aspects, comprise as the essential components:

(a) a prepolymer or oligomer selected from the group consisting of monofunctional vinyl resins and multifunctional vinyl resins; and/or (b) a monomer selected from the group consisting of monofunctional vinyl monomers and multifunctional vinyl monomers;

(c) a photoinitiator;

(d) a filler; and (e) at least one surface active agent, the agent selected having a molecular weight equal to or greater than 227 and a pH less than 7 and the filler having a pH equal to or greater than 7 whereby the filler is dispersed throughout the composition without tending to agglomerate, whereby, relatively high loading can be attained. Conversely, a filler whose pH is less than or equal to 7 may be used in connection with a surface active agent whose pH is greater than or equal to 7 with a molecular weight that is equal to or greater than 227.

The properties of the compositions disclosed herein and the resulting cured coatings can be altered somewhat by including in the composition various additional materials, according to well known and usual techniques. Thus, for example, the shelf or pot life of a particular composition can be extended by addition of inhibitors or stabilizers. Other additives offer, in some cases, better adhesion to the substrate coated, better fire retardancy, improved viscosity, leveling, wetting, flexibility, etc.

Although desirable from the standpoint of cost savings, compositions used for coating axial member and end pour electrical and electronic components, e.g. axial film foil capacitors, axial ceramic capacitors, axial resistors, stacked film foil capacitors, potting compounds for capacitors, hybrid circuit networks, thermistors and transformers need not include a filler. Nevertheless, where pear shaped, radial and disc components are to be coated, a filler is needed for high temperature and high humidity applications.

In addition to the other advantages disclosed above, the compositions of the invention are non-polluting, are environmentally safe, and are non toxic.

DETAILED DESCRIPTION OF THE INVENTION AND THE PREFERRED EMBODIMENTS THEREOF

The coating composition of the invention comprises as the essential components a mono- or multifunctional vinyl resin oligomer or prepolymer, or a mono- or multifunctional vinyl monomer, a photoinitiator, a filler, and at least one surface active agent.

The prepolymer can be any mono- or multifunctional resinous material provided it have at least one vinyl group. Illustrative of suitable materials for use as the prepolymer are:

aliphatic urethane acrylate and
aromatic urethane acrylate and methacrylate
polyester urethane acrylate and methacrylate
hydrocarbon urethane acrylate and methacrylate
cycloaliphatic epoxy acrylate and methacrylate
aliphatic epoxy acrylate and methacrylate
aromatic epoxy acrylate and methacrylate
amine modified epoxy acrylate and methacrylate
poly(acryloxypropylmethyl) siloxane
poly(dimethylsiloxane)-(diphenylsiloxane)-(methylvinyl siloxane)
polyvinylmethylsiloxane
tetramethyldisiloxane-ethylene copolymer vinyl terminated polydimethylsiloxane vinylmethyl copolymers
acrylated and methacrylated epoxy linseed oil
vinyl unsaturated polyesters
polybutadiene acrylate and methacrylate
polystyrene acrylate and methacrylate
polyester acrylate and methacrylate
vinyl caprolactam
caprolactam acrylate and methacrylate
silicone acrylates and methacrylates
melamine acrylate and methacrylate
copolymerized amine acrylate and methacrylate
cellulose acrylate and methacrylate
cellulose ester ether acrylate and methacrylate
hydrocarbon acrylate and methacrylate
polyoxyalkylated bisphenol A acrylate and methacrylate
acrylamidomethyl substituted cellulose ester acrylate and methacrylate
1-norbornene spiroorthocarbonate
2-bismethylene spiroorthocarbonate diallyl isophthalate
diallyl maleate Of the above prepolymers, aromatic urethane acrylate and methacrylate, hydrocarbon urethane acrylate and methacrylate, aromatic epoxy acrylate and methacrylate, and diallyl isophthalate are preferred.

These vinyl unsaturated prepolymers may be added to the composition in amounts of from 0 to 70% by weight of the composition, and preferably from 3 to 20% by weight of a coating composition. Nevertheless, as will be the case with all the components involved, the amount used will be determined somewhat by the properties desired in the cured composition, which, in turn, will be determined by the particular application involved, i.e., whether the composition is an ink composition or a composition to be used for coating electronic or electrical components. If the latter, the particular formulation desired will also be influenced by the particular components to be coated, including the shape thereof, and the manner of coating to be employed, e.g., dip coating, end pour, roll coating, etc.

The monomer used in the compositions of the invention can be a mono-or multifunctional vinyl monomer, the key being that the monomer must have at least one vinyl, or unsaturated, group whereby it will, on curing as later more specifically disclosed, cross-link and form a thermoset coating or ink. Monomers that will be found suitable in the practice of the invention are:
cyclohexyl acrylate
ethyl acrylate
butyl acrylate
2-ethylhexyl acrylate
2-hydroxyethyl acrylate
hydroxypropyl acrylate
N vinyl-2-pyrrolidone
2-ethoxy ethcxyethyl acrylate
isobornyl acrylate
methyl acrylate
dimethylaminoethyl acrylate
diethylaminoethyl acrylate
tetrahydrofurfuryl acrylate
n-hexyl acrylate
n-lauryl acrylate
2-phenoxyethyl acrylate
furfuryl-2-acrylate
3-dimethylamino neopentyl acrylate
2-cyanoethyl acrylate
benzyl acrylate
2N-morpholinoethyl acrylate
2-tert butyl aminoethyl acrylate
N-benzyl methacrylamide
2-(1-aziridinyl)-ethylacrylate
methacrylopyethyl phosphate
bismethacrylopyethyl phosphate
N-(iso butoxymethyl) acrylamide
3-phenoxy-2-hydroxypropyl acrylate
3-methacryloxypropyltris (trimethylsiloxy) silane
3-methacryloxypropylpentamethyldisiloxane
calcium methacrylate
chromium (III) dimethacrylate
sodium methacrylate
magnesium methacrylate
silicone (IV) trimethacrylate
tributyl tin methacrylate
zinc methacrylate
zirconium (IV) dimethacrylate
2-methacryloxyethyl phenylurethane
dicyclopentenyl acrylate
monomethoxy tripropylene glycol monoacrylate
monomethoxy neopentyl glycol ethoxylate monoacrylate
monomethoxy 1,6 hexanediol monoacrylate
propargyl methacrylate
isocyanotoethyl methacrylate
2-N-morpholinoethyl acrylate
allyl acrylate
styrene
vinyl acetate
N-cyclohexyl methacrylamide
N, N'-isovalerylidene-bis-methacrylamide
3,3,5 trimethylcyclohexyl acrylate
dihydrodicyclopentadienyl acrylate
maleic acid-mono-2-acryloxyethylester
maleic acid-mono-2-methacryloxyethylester
n-octyl acrylate
diallyl fumarate
tripropylene glycol diacrylate
1,6 hexanediol diacrylate
N, N -methylenebisacrylamide
triethylene glycol diacrylate
ethylene glycol diacrylate
polyethylene glycol diacrylate
1,3 butylene glycol diacrylate
1,4 butanediol diacrylate
diethylene glycol diacrylate
diphenylvinylchlorosilane
1,3 divinyl-1,3 diphenyl-1,3 dimethyldisiloxane
1,3-divinyltetramethyldisiloxane
neopentyl glycol diacrylate
ethoxylated bisphenol A diacrylate
caprolactone diacrylate
2-methyl-2-carboxy propanediol diacrylate
thiodiglycol diacrylate
allyl acrylate
dianol diacrylate
3-methylbutene-2-yl-1-acrylate
N,N'hexamethylene-bis-methacrylamide
monomethoxy trimethylolpropane diacrylate
monomethoxy pentaerythritol propoxylate triacrylate
monomethoxy glycerol propoxylate diacrylate
trimethylol propane triacrylate
pentaerythritol triacrylate
trimethylolpropane ethoxylate triacrylate
polyether triacrylate
mono-methoxy pentaerythritol propoxylate triacrylate
triallylcyanurate
melamine acrylate
tris (2-hydroxy ethyl) isocyanurate trimethacrylate
1,6 hexanediol diglycidyl ether diacrylate
triallyl trimellitate
pentaerythritol tetraacrylate
dipentaerythritol monohydroxypenta acrylate
dipentaerythritol pentaacrylate
dipentaerythritol hexaacrylate
vinyl tris(isopropenoxy) silane
1,3,5 trivinyl-1,1,3,5,5-pentamethyltrisiloxane The preferred monomers are alpha, beta unsaturated carboxy compounds. Most preferred monomers are acrylates, and alkacrylates such as isobornyl acrylate, dicyclopentenyl acrylate, 1,6-he diacrylate, and trimethylol propane triacrylate and alkylacrylate relatives of all of the foregoing.

In general, these vinyl unsaturated monomers may be added to the composition in amounts ranging from 1 to 70% by weight of the composition, and preferably from about 3 to about 20% by weight of a coating composition used.

Photoinitiators and sensitizers suitable for use in the radiation curable compositions of this invention are any of those commonly used for this purpose. Thus, compositions of this invention can include various known photosynergists, e.g. alkylamines, alkanolamines, and morpholines, or commonly used photoinitiators, e.g. either those involving hydrogen abstraction or intramolecular photocleavage. Examples of suitable photosynergists and sensitizers are:

alkylamines
alkanolamines
morpholines
2-(n butoxy) ethyl 4-dimethylaminobenzoate
ethyl para dimethyl amino benzoate
2-(dimethylamino) ethyl benzoate
diethanol amine
monoethanol amine
dimethylethanol amine
dimethylaminoethyl acrylate and methacrylate
diethylaminoethyl acrylate and methacrylate
N-methyldiethanolamine
2-ethylhexyl p-(N, N-dimethylamino) benzoate
2,2 dithiobisbenzothiazole
bis-ethylamino benzophenone Examples of photoinitiators which can be used in the practice of the invention include:

N,N dimethylaminobenzophenone
d,1 camphorguinone
2-isopropylthioxanthone
4-isopropylthioxanthone
benzophenone
benzil
2-chlorothioxanthone
2-methylthioxanthone
chlorine functional substituted benzophenone
halogen substituted alkyl-arylketone
4-benzoyl 4-methyl-diphenyl sulphide
2,4,6 trimethylbenzoyldiphenylphosphine oxide
methyl phenylglyoxylate
dibenzosuberone
isobutyl benzoin ether
isopropyl benzoin ether
benzoin ethyl ether
benzoin methyl ether
1-phenyl-1,2 propane-dione-2 (0-ethoxycarbonyl) oxime
2-2, dimethoxy-2, phenyl-acetophenone
1,hydroxy cyclo hexyl phenyl ketone
2,2 diethoxyacetophenone
2-hydroxy-2 methyl-1 phenyl propan 1 one
2-methyl-1-(4-methylthio) phenyl)-2 (4 morpholinyl)-1-propanone
4,4'bis-(dimethylamino) benzophenone
dibenzosuberone
valerophenone
alpha-tetralone
9-fluorenone
tri-o-tolylphosphine
benz [a] anthacene-7,12-dione
7-H-benz [de] anthracene-7-one
hexanophenone
4,4'-dimethoxybenzophenone
4-methoxybenzaldehyde
2,4 dimethylthioxanthone
2,3 butanedione
alpha, alpha, alpha trichloroacetophenone
dimethylsilane-dimethylsiloxane copolymer The preferred photoinitiators for use in the compositions are 2-2 dimethoxy-2, phenyl acetophenone, 2-hydroxy-2 methyl-1 phenyl propan-1-one, 2-ethylhexyl p (N, N-dimethylamino) benzoate and 2 isopropylthioxanthone.

In general, the amount photoinitiator or sensitizer used will depend somewhat upon that particular one chosen, and the formulation of monomers and prepolymers involved. However, as a rule of thumb the photoinitiator used will depend upon the desired depth of cure, reaction kinetics, solubility in the system, shelf life of the composition and wavelength of radiation used. The photoinitiators may be added to the composition in amounts ranging from 1 to 15% by weight of the composition; and preferably from about 2 to about 6% by weight of a coating composition.

It will be readily appreciated by those skilled in the art that such photoinitiators and sensitizers as set forth above will not be incorporated in any composition where such is to be cured by electron beam radiation.

Although not a critical feature of the invention, the addition of peroxides or other known accelerators to the compositions disclosed herein will hasten their cure. Thus, in the case where the thickness of the coating layer is to be greater than about 10 mils, it may be desirable to include in the composition such an accelerator. Examples of peroxides that will be found suitable for this purpose, and as an optional component, are:

diacyl peroxide
ketone peroxides
peroxydicarbonates
peroxyesters
dialkyl peroxides
hydroperoxides
sulfonyl peroxides
peroxyketals
symmetric and unsymmetric azonitrile
dialkyl peroxydicarbonate
tetra-alkyl peroxyester
tetra-alkyl hydroperoxide
peroxyacids Of critical significance in the compositions disclosed herein is the incorporation in the composition of at least one surface active agent. The total amount of surface active agent(s) are preferably added to the composition in amounts ranging from about 0.5 and about 4% by weight of the composition. Such agents include various of those components that are variously referred to in the art as surfactants, dispersants or dispersing agents, emulsifiers, suspension agents and solublizers. The critical thing in the selection of any particular surface active agent is that such a selection be made in consideration of the filler which is to be used in the composition as the particular surface active agent used will determine the maximum loading of filler in any particular composition. Thus, the surface active agent chosen for use in any particular composition will depend to a great extent upon the pH of the filler to be used, and upon that of any pigment that might also be used in the composition.

In general, one must use a surface active agent whose pH is less than 7 and whose molecular weight is greater than or equal to 227 with a filler whose pH is greater than or equal to 7. Conversely, a surface active agent whose pH is greater than 7 and whose molecular weight is greater than or equal to 227 can be used with a filler whose pH is less than or equal to 7. Such matching results in the best dispersion of the filler with attendant greater loading.

In some cases, the use of two surface active agents in combination are preferred for best results. Silane, for example, does not, alone, provide maximum loading of fillers having a negative charge. Such fillers, e.g. calcium metasilicate (wollastonite), disperse only to a certain loading, e.g. about 42% by weight of the composition, or 52% volume of filler, and above that loading, the filler tends to agglomerate. Nevertheless, when a different surface active agent or a second surface active agent, e.g. phosphate acid ester (such as GAFAC, RE-610), is added to the composition, the filler particles then disperse from one another, with attendant reduction in viscosity (see Table 1, Experiment No. 1).

The surface active agent to be used can, if desired, be used to coat the filler particles prior to their introduction in the composition. Such a pretreatment of fillers is known, and silane treated fillers are available commercially. Moreover, where two surface active agents are necessary in the composition, to obtain maximum loading and polymer properties, the use of a surface active agent coated filler will be found st advantageous.

Examples of surface active agents that can be used in the invention are:
fish oil (one or more of oleic, palmitic and stearic acid)
anionic polyelectrolyte
linoleic acid
oleic acid
palmitic acid
stearic acid
carboxylic acids
oleoyl acids
stearoyl sarcosine
sodium salt of polycarboxylic acids
anionic/nonionic surfactant blend
fatty alcohol ethoxylates
organic phosphate ester acid
acid phosphate ester of fatty alcohol alkoxylate
silanes
titanates A most preferred surface active agent is the phosphate acid ester GAFAC, RE 610. This surface active agent whose pH is less than 7 results in good dispersion of the calcium metasilicate filler whose pH is 9.9 when introduced into the composition. Other phosphate acids esters which are useful as dispersants are GAFAC: RS 610, RS-410, RE-410, RM 710, RM 510, RM 410, RS 710, RP 710, PE-510, RD-510, RA-600, and Emphos, PS-21A, and also non phosphate acid esters such as: fish oil, oleic acid, palmitic acid, and stearic acid. The effect each dispersant has o silane treated calcium metasilicate (400-NYAD-1024) and untreated calcium metasilicate (400-NYAD) are given in Table 1 and Table 2, respectively. Table 1 is a list of dispersants and their effect on the treated filler as illustrated by the high volume % filler. The dispersants used herein give higher volume % filler loadings than the previous mentioned dispersants in U.S. Pat. Nos. 3,896,014; 4,349,605; and 4,390,401. Table 2 is a selected list of dispersants and their effect on untreated filler. The dispersants used gave a higher % volume filler than previously disclosed in the patents just listed.

The monomer, photoinitiator, and surface active agent were mixed at ambient temperature for 15 minutes. Filler was added gradually over 30 minutes, whereby the mixture temperature increased to 85° C. due to the high shear generated during mixing. The composition upon mixing with dispersant remained fluid, whereas, the mixture composition without dispersant was a solid compact cake of high viscosity.

Table 3 is a summary of materials referred to herein by trade or code names listing corresponding chemical names thereof and available sources of supply.

TABLE 1

Effect of Dispersant on Silane Treated Calcium Metasilicate Filler

| Materials | 1 % wt. | 2 % wt. | 3 % wt. | 4 % wt. | 5 % wt. | 6 % wt. | 7 % wt. | 8 % wt. | 9 % wt. | acid value range | average molecular weight |
|---|---|---|---|---|---|---|---|---|---|---|---|
| Monomer HDODA | 12.87 | 12.9 | 14.8 | 16.4 | 12.8 | 12.8 | 12.8 | 12.8 | 12.8 | | |
| Photoinitiator 1173 | 1.6 | 1.6 | 1.6 | 1.6 | 1.6 | 1.6 | 1.6 | 1.6 | 1.6 | | |
| Dispersants | | | | | | | | | | | |
| Re-610 | 1.6 | | | | | | | | | 62.72 | 837 |
| Rs-610 | | 1.6 | | | | | | | | 75–85 | 701 |
| Ps-21A | | | 1.8 | | | | | | | 130 | 431 |
| Rs-410 | | | | 3.4 | | | | | | 95–115 | 534 |
| RE-410 | | | | | 3.2 | | | | | 85–100 | 606 |
| RM-710 | | | | | | 1.6 | | | | | 1516 |
| RM-510 | | | | | | | 1.6 | | | 45–55 | 1122 |
| RM-410 | | | | | | | | 5.1 | | 51–64 | 975 |
| BH-650 | | | | | | | | | 19.4 | 370–390 | 147.6 |
| Filler 400-NYAD-10024 | 84.0 | 83.9 | 81.8 | 78.7 | 82.3 | 82.3 | 82.6 | 82.0 | 82.0 | | |
| VOLUME % FILLER | 65.9 | 65.7 | 62.4 | 57.7 | 63.3 | 65.5 | 65.6 | 60.8 | 47.2 | | |

| Materials | 10 % wt. | 11 % wt. | 12 % wt. | 13 % wt. | 14 % wt. | 15 % wt. | 16 % wt. | 17 % wt. | 18 % wt. | acid value range | average molecular weight |
|---|---|---|---|---|---|---|---|---|---|---|---|
| Monomer HDODA | 12.8 | 12.8 | 12.8 | 12.8 | 12.8 | 12.8 | 12.8 | 12.8 | 12.8 | | |
| Photoinitiator 1173 | 1.6 | 1.6 | 1.6 | 1.6 | 1.6 | 1.6 | 1.6 | 1.6 | 1.6 | | |
| Dispersants | | | | | | | | | | | |
| RS-710 | 2.5 | | | | | | | | | 58–70 | 876 |
| RP-710 | | 5.0 | | | | | | | | 85–100 | 575 |

TABLE 1-continued
Effect of Dispersant on Silane Treated Calcium Metasilicate Filler

| | | | | | | | | | | |
|---|---|---|---|---|---|---|---|---|---|---|
| PE-510 | | 5.5 | | | | | | | 49-59 | |
| RD-510 | | | 4.9 | | | | | | 100-115 | 522 |
| RA-600 | | | | 7.3 | | | | | 100-115 | 522 |
| RK-500 | | | | | 11.8 | | | | 132-145 | 405 |
| RK-750 | | | | | | 15.9 | | | 250-275 | 214 |
| 2-ethyl-hexanoic acid | | | | | | | 9.7 | | 389 | 144 |
| myristic acid | | | | | | | | 1.6 | 247 | 227 |
| Filler 400-NYAD-10024 | 82.4 | 82 | 82 | 82 | 82 | 82 | 82 | 81 | 52.7 | |
| VOLUME % FILLER | 64.3 | 60.9 | 60.3 | 61.1 | 58.2 | 53.6 | 50 | 55.3 | 54.8 | |

| Material | Experiment Number | | | | | | acid value range | molecular weight |
|---|---|---|---|---|---|---|---|---|
| | 19 % wt. | 20 % wt. | 21 % wt. | 22 % wt. | 23 % wt. | 24 % wt. | | |
| Monomer HDODA | 12.8 | 12.8 | 12.8 | 12.8 | 12.8 | 12.8 | | |
| Photoinitiator 1173 | 1.6 | 1.6 | 1.6 | 1.6 | 1.6 | 1.6 | | |
| Dispersants | | | | | | | | |
| palmitic acid | 1.9 | | | | | | 218 | 257 |
| stearic acid | | 1.8 | | | | | 198 | 283 |
| oleic acid | | | 1.6 | | | | 202 | 278 |
| fish oil | | | | 1.6 | | | — | — |
| Z-6030 | | | | | 2.4 | | — | — |
| Filler 400-NYAD-10024 | 77.2 | 78 | 78.6 | 80 | 72.22 | 42.2 | | |
| VOLUME % FILLER | 63.6 | 63.9 | 64.4 | 64.8 | 49.6 | 51.9 | | |

TABLE 2
Effect of Dispersant on Untreated Calcium Metasilicate Filler

| Material | Experiment Number | | | | | | | | | | acid value range | average molecular weight |
|---|---|---|---|---|---|---|---|---|---|---|---|---|
| | 1 % wt. | 2 % wt. | 3 % wt. | 4 % wt. | 5 % wt. | 6 % wt. | 7 % wt. | 8 % wt. | 9 % wt. | 10 % wt. | | |
| Monomer HDODA | 12.8 | 12.8 | 12.8 | 12.8 | 12.8 | 12.8 | 12.8 | 12.8 | 12.8 | 12.8 | | |
| Potoinitiator 1173 | 1.6 | 1.6 | 1.6 | 1.6 | 1.6 | 1.6 | 1.6 | 1.6 | 1.6 | 1.6 | | |
| Dispersant | | | | | | | | | | | | |
| RE-610 | 1.6 | | | | | | | | | | 62-72 | 837 |
| Rs-610 | | 1.6 | | | | | | | | | 75-85 | 701 |
| Ps-21A | | | 1.6 | | | | | | | | 130 | 431 |
| RE-410 | | | | 3.5 | | | | | | | 85-100 | 606 |
| fish oil | | | | | 1.6 | | | | | | — | — |
| RA-600 | | | | | | 8.5 | | | | | 100-115 | 522 |
| myristic acid | | | | | | | 1.6 | | | | 247 | 227 |
| oleic acid | | | | | | | | 1.6 | | | 202 | 278 |
| Z-6030 | | | | | | | | | 2.6 | | — | — |
| Filler 400 NYAD | 83.6 | 82.0 | 80.7 | 81.5 | 78.0 | 81.5 | 51.0 | 77.6 | 48.2 | 41.2 | | |
| VOLUME % FILLER | 65.8 | 65.4 | 65 | 62.7 | 62.3 | 56.8 | 54 | 64.1 | 51.1 | 51.4 | | |

TABLE 3

| Code | Materials Used Trade Name/Chemical Name | Company |
|---|---|---|
| NYAD 400 | Wallastonite, calcium metasilicate, | NYCO |
| NYAD 400 Wollastokup 10024 | calcium metasilicate, (silane treated filler with Z-6030), | NYCO |
| 231-Lupersol, | (1,1-di-t-butylperoxy)-3,3,5 trimethylcyclohexane, | Pennwalt Corp. |
| Z-6030, | gamma-methacryloxypropyltrimethoxysilane, | Dow Corning |
| Anonic GAFAC ® Surfactant, | | GAF Chemicals |
| | poly (oxy-1,2-ethanediyl, alpha-(dinonylphenyl)-omega-hydroxy, phosphate; common names: | |
| RM-510 | nonyl nonoxynol-10-phosphate | |
| RM-710 | nonyl nonoxynol-15-phosphate | |
| RM-410 | nonyl nonoxynol-7-phosphate | |
| | poly(oxy-1,2-ethanediyl), alpha-(nonylphenyl)-omega-hydroxy, phosphate; common names: | |
| RE-610 | nonoxynol-9-phosphate | |
| RE-410 | nonoxynol-4-phosphate | |
| | poly(oxy-1,2-ethanediyl), alpha-tridecyl-omega-hydroxy- | |

TABLE 3-continued

Materials Used

| Code | Trade Name/Chemical Name | Company |
|---|---|---|
| | phosphate; common names: | |
| | trideceth-6-phosphate | RS-610 |
| | trideceth-4-phosphate | RS-410 |
| | trideceth-7-phosphate | RS-710 |
| | poly(oxy-1,2-ethanediyl), alpha-dodecyl-omega-hydroxy-, phosphate; common names: | |
| | polyoxyethylene lauryl ether phosphate | RD0510 |
| | poly(oxy-1,2-ethanediyl), alpha-phenyl-omega-hydroxy-phosphate; or, polyoxyethylene phenyl ether phosphate RP-710 | |
| | 3,6,9,12-tetraoxyhexadecan-1-ol, 15 methyl, dihydrogenphosphate and monohydrogen phosphate; or, | |
| | isoamyl alcohol, ethoxylated, phosphate-BI750 | |
| | polyphosphoric acids; 2-Butoxyethyl esters polyoxyethylene butoxyethyl ether phosphate, BH-650 | |
| | poly(oxy-1,2-ethanediyl), alpha-hexyl-omega-hydroxy-, phosphate; polyoxyethylene hexyl ether phosphate, RK-500 | |
| | Fish oil: oleic acid, palmitic acid, and stearic acid, H. J. Baker & Bro., Inc. | |
| | PS-21A, Emphos, phosphate acid ester, Witco Chemical | |
| | 1173, Darocur, 2-hydroxy-2-methyl-1-phenyl-propan-1-one, EM Chemicals | |
| | 1573, Epoxy acrylate Resin, Cargill, Inc. | |
| | HDODA, 1,6 hexanediol diacrylate, Interez | |
| | TMPTA, trimethylolpropane triacrylate, Interez | |
| | Fc430, Fluorad, fluorinated hydrocarbon, 3M | |
| | Oncor, Thermoquard S, antimony trioxide, M & T Chemicals, Inc. | |
| | Air Out, petroleum ether, Furane Products Co. | |
| | IR-651, Irqacure, 2,2 dimethoxy-2, phenyl-acetophenone, Ciby Geigy | |
| | DCPA, dicyclopentenyl acrylate-Alcolac | |
| | DBDPO, decabromodiphenyl oxide-Great Lakes | |
| | ITX, isopropylthioxanthone, Ward/Blenkinsnop | |
| | TBP, TRIGONOX-C t-butyl peroctoate, Noury Chemical Co. | |
| | 3600, Celrad 3600, amine modified diacrylate ester of bisphenol A epoxy resin, Interez | |
| | Cab-o-sil, fumed silica, Cabot | |
| | EPB, ethyl-para-dimethylaminobenzoate, Ward/Blenkinsnop | |
| | 325, NYAD, calcium metasilicate, NYCO | |
| | 325 Wallastokup-10022, NYAD, calcium metasilicate, NYCO | |
| | L-722, Silwet, polydimethylsiloxane, Union Carbide | |
| | MK, 4,4-Bis(dimethylamino)-benzophenone, Eastman | |

The amount of surface active agent used in any particular formulation will depend to some extent on the particular filler used, the process of manufacturing the filler, its surface area, etc., and the amount of filler to be loaded in the composition. The amount filler used, in turn, will depend somewhat upon the particular application for the coating composition. Where a more fluid flowing coating is desired, for example, in potting electrical and electronic components, a lesser amount of filler in general will be used.

Examples of fillers that can be used in the compositions of this invention are:
barium sulfate
talc
sodium carbonate
zinc oxide
silica
silicates
alumina
aluminates
berilla
metaborates
calcium sulfate
aluminum silicate
phosphates
metasilicates
zirconates
metal oxides
lithium aluminum silicate
wallastonite
titanates In general, the compositions of this invention may contain a filler from about 20 to about 90% of filler by weight of the composition or 8 to 77% volume of filler, preferably the concentration of filler will be from about 25 to about 84% by weight of the composition or 11 to 66% volume of filler. Where such compositions are used for coating tantalum capacitors, ceramic disc capacitors, radial film foil capacitors, hybrid circuits, etc., less than about 59% by weight of calcium metasilicate filler in the polymeric composition results in polymer degradation with formation of cracks in the coating when such coating is subject to 125° C. for 1,000 hours, a specification which must be met in this application. To some extent the amount of filler in any composition will depend upon the particular application therefor, i.e., what electrical and electronic component is to be coated, and what physical properties are desired in the cured, polymerized, hardened coating. Furthermore, the manner of coating the substrate will also determine to some extent the concentration of filler. In general, where the coating composition is used to end pour an electrical and electronic component less concentration of filler will be desired than in the case of encapsulating a tantalum capacitor.

In addition to the aforesaid essential ingredients, other components such as disclosed hereinafter can be included in the composition, as desired, and so long as they do not interfere with the curing process. Thus, for example, it may be desirable for a particular application, to include in the composition one or more of the following components: a wetting agent, a plasticizer, a leveling agent, a thixotropic agent, a flame retardant, an adhesion promoter, a stabilizer, or an inhibitor, all of which are commonly used in the formulation of coating compositions and inks, to afford certain desired physical properties thereto. To further illustrate the various other additives that may be incorporated in the composition of the invention, the following is given:

Wetting Agents

Examples of various wetting agents that can be used in the invention are: polyethylene glycol fatty esters, nonyl phenol ethylene oxide, flourinated hydrocarbons, 2,2,3,3 tetraflouropropylmethacrylate and acrylate, flourinated alkyl polyoxyethylene ethanol, polypropoxy quaternary ammonium acetate, polymethylsiloxane, and ammonium salt of sulfated nonylphenoxypoly (ethyleneoxy) ethanol. The preferred wetting agents are flourinated hydrocarbons. Fc 430 is the flourinated hydrocarbon used herein that is soluble in the composition and, likewise, lowers the composition s surface tension.

Plasticizers

Examples of various plasticizers that can be used in the invention are: adipates, azelates, benzoates, epoxidized linseed oil, hydrocarbons, phosphates, polyesters, phthalates, trimellitates, aliphatic siloxanes, nonionic (polyethylene oxides), anionic (sodium lauryl sulfates), and cationic (cetyl pyridinium chloride). Those skilled in the art of formulating coating compositions will be able to select that particular plasticizer most suitable in any particular application. It will be appreciated, as earlier suggested, that use of such a component in any specific case is entirely optional and will depend upon the desired flexibility in the cured coating. For example, it may be desirable to include a plasticizer in a coating composition containing an epoxy acrylate resin, as such compositions, in general, will be found, on curing, to be relatively rigid.

Leveling Agents

Examples of various leveling agents that can be used in the invention are: sucrose benzoate, copolymer 2-ethylhexyl acrylate and ethyl acrylate, calcium stearate, and nonionic surface active agents.

Thixotropic Agents

Examples of various thixotropic agents that can be used in the invention are: aluminum, calcium and zinc salts of fatty acids such as lauric or stearic acid; fumed silica, hydrated siliceous material, calcium carbonate, magnesium oxide, high molecular weight polyacrylic acids, stearates, polysubstituted sorbitols, bentonite, and chrysotile asbestos. In general, such an additive will be found desirable in compositions used on radial leads, or in applications involving roll coating and dipping. Of the above, fumed silica will be found particularly satisfactory. Also, in addition to the above, it will often be found that any of the fillers above mentioned, will produce the desired thixotropic properties.

Flame Retardants

Examples of various flame retardants that can be used in the invention are: tetrabromo disphenol A diacrylate, methyl pentachlorostearate, bis(tribromophenoloxy) ethane, aluminum trihydrate, antimony oxide chlorinated paraffins, chlorinated cycloaliphatics, aromatic bromine compounds, phosphates, zinc borates, barium metaborates, ammonium floroborates, decabromodiphenyl oxide, ammonium bromide, and phosphorium bromide.

Adhesion Promoters

Examples of various adhesion promoters that can be used in the invention are: dimethylaminoethyl acrylate and methacrylate, diethlaminoethyl acrylate and methacrylate, silanes, titanates, allyl ether of cyclic ureido, zircoaluminate, lignocellulosic, and thiodigylcol diacrylates and methacrylates. In some instances, where greater adhesion is required with a particular substrate coated, the adhesion will be obtained by first heating the substrate, and then applying the coating composition.

Stabilizers

Examples of various stabilizers that can be used in the invention are: 2-hydroxy 4-alkoxy benzophenones, 2(2 hydroxy phenyl) benzotriazole, salicylates, resorcinol monobenzoates, aryl or alkyl hydroxy benzoates substituted oxanilides, substituted formamidine, 2,2 thiobis (4-octylphenolato)-n-butylamine nickel II, nickel salts of thiocarbamate, alkylated phenol phosphonate nickel, and tetramethyl pyperidine. Such compounds will be used as necessary to increase the pot life of the coating or ink composition.

Inhibitors

Examples of various inhibitors that can be used in the invention are: hydroquinone, p-methoxyphenol, alkyl and aryl-substituted hydroquinones and quinones, tert butyl cathechol, pyroqallol, octadecyl-B-(hydroxy-3,5-di t butyl phenyl)-propionate, 2,6-di-tert, butyl-4-methyl phenol, phosphorous acid, beta napthol, 2,6-di-tert butyl p cresol, 2,2-methylene bis(4 ethyl 6 t-butylphenol), p-toluquinone, aryl and alkyl phosphites, and benzotriazoles. Addition of such components to the compositions of this invention will increase the shelf life, as desired.

Those skilled in the art of formulating coating compositions can readily determine the amounts of such optional additives, to be added to any particular composition of our invention, for any particular application and desired property. Such materials are, in general, present in the compositions in very minor concentrations, ranging from less than 5% by weight of the polymer composition, and usually less than 3% by weight of the polymer compositions. In any event, such additives are not included in any significant amount whereby the additives do not interfere with the cross-linking of the polymeric material or to lessen the good properties desired, and achieved, in the cured coating.

In preparing the coating compositions of this invention, the components are mixed together by conventional procedures used in the production of inks, and coating compositions. These procedures are so well known to those skilled in the art that they do not require further discussion here. However, it should be noted that when the composition is to be UV cured it will be necessary that the photoinitiator be incorporated into the coating compositions and that the curable coating formulation be mixed or blended under "safe light" such as a yellow light source to obviate or minimize photopolymerization.

The components can be mixed together and formulated into the desired composition using any conventional mixing apparatus, e.g. a Banbury or Werner & Pfliderer mixer. The components can be added together in any sequence desired. Nevertheless, it is preferred that the surface active agent be added first to the prepolymer, monomer mixture followed by addition of the filler. Any processing apparatus used should obtain thorough mixing of the essential components and provide that the surface active agent is intimately and thoroughly dispersed throughout the polymer/monomer mixture.

In the more preferred manne of formulating the compositions of this invention, the filler will be pre-treated with a surface active agent. This can be accomplished by using filler coated in a previous operation, or by adding the surface active agent first to the mixer and next dispersing the filler therein.

The curable coating compositions of this invention can be applied to a suitable surface of substrate, e.g. an electrical and electronic component, by conventional means such as roll or dip coating, end pouring, spraying, etc. Curing, or photopolymerization of the coating compositions occurs on exposure of the compositions to any source of reaction emitting actinic radiation at a wavelength within the appropriate ultraviolet or visible spectral regions. Suitable sources of radiation include mercury, xenon, carbon arc and tungsten filament lamps, sunlight, etc. Exposures may be from less than about 4 seconds to 5 minutes or more depending upon the amounts of particular polymerizable materials and photoinitiators being utilized, and depending upon the radiation source and distance from the source, and the thickness of the coating to be cured. The compositions may also be polymerized by exposure to electron beam irradiation without the need of photoinitiator or synergist in the composition. Generally speaking the dosage necessary is from less than 1 megarad to 10 megarad or more.

The following examples, in which all parts are expressed by weight percent of total composition will serve to illustrate the invention more fully.

EXAMPLE 1

UV Curable, Highly Thixotropic, Flame Retardant Conformal Coating for Electrical and Electronic Components This example illustrates the effectiveness of the composition in coating pear-shaped electrical and electronic components such as tantalum capacitors.

The composition is prepared by mixing together the prepolymer, monomer, photoinitiators, sensitizes, wetting agent and dispersant in the weight percentages given below. The mixture is preferably heated to 60° C. whereby any solid photoinitiators are dissolved. When the photoinitiator is completely dissolved, the filler, flame retardant additives and pigment are added and mixing continued for 15 minutes while maintaining a temperature within the range of 60°-80° C. The mixture is allowed to cool to ambient conditions before adding the peroxide and bubble breaker. Mixing is resumed at low shear and ambient temperatures until peroxide and bubble breaker are thoroughly mixed.

These compositions are coated onto dry slug tantalum capacitors by dipping the preheated capacitors at 85° C. into the resin composition and withdrawing the units on chipboards with mechanical agitation. Units are then exposed to actinic radiation within the wavelength region of 185–400 nm for 5 seconds. The same units are subsequently dipped a second time and exposed again to the said radiation for 5 seconds. Coating thicknesses of 250 mils were necessary to ensure complete coverage of the "hockey stick" leads that make up the cathode and anode functions of the capacitor.

As the coating thickness of this electrical and electronic component is 250 mils, the coating is further subjected to a postheat treatment for 15 minutes at 85° C. This thermal treatment hastens the further cross-linking of the polymeric composition. Nevertheless, where the coating thickness is less than about 10 mils, no such thermal treatment is needed, as the crosslinking of the polymeric composition is essentially completed during the UV curing.

The cured coating composition was evaluated according to usual techniques and was found to exhibit low shrinkage, high tensile and compression strength, as well as broad operating temperatures (−65° to 125° C.) over 1,000 hours of service life. In addition, the coating is able to withstand high temperature concomitant with high humidity conditions without seriously degrading the electrical behavior of the component. Table 5 illustrates the average electrical properties for twenty units of each of the compositions A–D set forth in Table 4 tested under high temperature (85° C.) concomitant with high humidity (95% RH) conditions for 1,000 hours. In the table, electrical properties are better for the treated filler with dispersant added (composition A) and for the treated filler without dispersant (compositions B and C) than for the untreated filler (competition D). The untreated filler composition showed severe cracking after 500 hours at 125° C.

As this example shows, the compositions of this invention combine ease in handling with desired physical, thermal, electrical insulation and moisture resistance properties.

TABLE 4

Dry Slug Tantalum Capacitor Compositions

| Materials | Composition (% wt.) | | | |
|---|---|---|---|---|
| | A | B | C | D |
| Prepolymer 1573 | 5.5 | 4.0 | 5.0 | 9.0 |
| Monomer | | | | |
| DCPA | 6.0 | 4.0 | 7.6 | 8.3 |
| TMPTA | 6.5 | 12.5 | 10.7 | 8.0 |
| HDODA | | | | |
| Wetting Agent Fc430 | 0.8 | 1.3 | 1.3 | 0.8 |
| Photoinitiator & Sensitizers | | | | |
| IR-651 | 2.0 | 2.1 | 2.1 | 2.1 |
| ITX | 1.0 | | | |
| EPB | 1.5 | | | |
| Dispersant RE-610 | 1.3 | | | |
| Flame Retardants | | | | |
| Oncor | 2 | 2 | 2 | 2.0 |
| DBDPO | 5.7 | 5.7 | 5.7 | 5.7 |
| Fillers | | | | |
| *400-NYAD-10024 (Wallastonite) | 66 | 62.8 | 61.5 | |
| *400-NYAD (Wallastonite) | | | | 61.5 |
| Pigment Dye | 0.5 | 0.5 | .05 | 0.5 |
| Peroxide | | | | |
| TBP | | 5.0 | 3.5 | 2.0 |
| L-231 | 1 | | | |
| Bubble Breaker Air Out | 0.1 | 0.1 | 0.1 | 0.1 |

*400-NYAD-10024 is calcum metasilicate treated with 1%, Z-6030 silane (Dow Corning) at a 1% by weight silane per calcium metasilicate (Wallastokup)

TABLE 5

Electrical Properties
Humidity at 85° C., 95% RH, for 1,000 hours
Testing done at 0.5 V, 120 Hz

| Composition | Initial Electrical Values | | | Final Electrical Values | | |
|---|---|---|---|---|---|---|
| | CAP (uf) | DF (%) | ESR (ohm) | CAP (uf) | DF (%) | ESR (ohm) |
| A | 48.40 | 3.60 | 0.99 | 49.52 | 3.80 | 1.04 |
| B | 49.11 | 3.72 | 1.01 | 51.00 | 4.29 | 1.12 |
| C | 48.87 | 3.37 | .91 | 50.70 | 3.89 | 1.02 |
| D* | 49.21 | 3.42 | .92 | 51.57 | 6.74 | 1.66 |

*Test done for only 500 hours. Parts are severely split.
CAP - Capacitance in microfarads
DF - dissipation factor in percent
ESR - electrical series resistance in ohms

EXAMPLE 2

Low Viscosity, Flame Retardant, UV Curable End Pour System for Smaller Electrical and Electronic Components The compositions of this example are particularly suitable as protective coatings for smaller electrical and electronic components such as axial leaded film foil capacitors, hybrid circuits, printed circuit boards, transformers, delay lines, electrolytic capacitors, axial leaded resistors, etc., in which the composition is poured into the end of the tape wrapped unit, preformed casing, metal casing, etc.

The units, end poured in this example, are axial leaded film foil cylindrical capacitors whose diameter ranges from 0.0625 to 0.25 inches, and whose length ranges from 0.50 to 1.50 inches.

TABLE 6

| | End Pour Encapsulant Composition (% wt.) | | | | | |
|---|---|---|---|---|---|---|
| Materials | A | B | C | D | E | F |
| Prepolymer 1573 | 10 | 9 | 10 | 9 | 10 | 9 |
| Monomer | | | | | | |
| DCPA | 12 | 20.3 | 13 | 21.2 | 12 | 20.3 |
| HDODA | 14 | | 14 | | 14 | |
| TMPTA | | 10.5 | | 10.5 | | 10.5 |
| Photoinitiator IR-651 | 2.1 | 2.1 | 2.1 | 2.1 | 2.1 | 2.1 |
| Dispersant RE-610 | 1.0 | 0.9 | | | 1.0 | 0.9 |
| Pigment Dye | 1.2 | 1.2 | 1.2 | 1.2 | 1.2 | 1.2 |
| Flame Retardant | | | | | | |
| Oncor | 2 | 2 | 2 | 2 | 2 | 2 |
| DBDPO | 5.7 | 5.7 | 5.7 | 5.7 | 5.7 | 5.7 |
| Filler | | | | | | |
| NYAD-325 | 50 | 46.3 | | | | |
| NYAD-325-10022 | | | 50 | 46.3 | 50 | 46.3 |
| Peroxide TBP | 2 | 2 | 2 | 2 | 2 | 2 |
| Viscosity | 550 | 1000 | 750 | 1200 | 400 | 800 |

(cps; centipoise)

TABLE 7

Electrical Properties
End Pour, "Mylar" Tape Wrapped Capacitors
Humidity at 75° C., 95% RH, for 100 hours

| | Initial Electrical Values | | | Final Electrical Values | | |
|---|---|---|---|---|---|---|
| Composition | CAP (uf) | DF (%) | ESR (ohm) | CAP (uf) | DF (%) | ESR (ohm) |
| A | 10.41 | .004 | .01 | 10.46 | .004 | .01 |
| B | 10.37 | .004 | .01 | 10.38 | .004 | .01 |
| C | 10.30 | .003 | .01 | 10.28 | .003 | .01 |
| D | 10.39 | .004 | .01 | 10.41 | .004 | .01 |
| E | 10.37 | .004 | .01 | 10.41 | .004 | .01 |
| F | 10.21 | .003 | .01 | 10.28 | .003 | .01 |

The above compositions (A-F in Table 6) are generally applied by automatic, premeasured, volumetric dispensers. Other methods such as spray and dip application before potting are also possible. Coating thicknesses generally range from 0.010 to 0.500 inches. The coating is subjected to UV curing, as before disclosed in Example 1, by exposure for 6 seconds under a medium pressure mercury vapor lamp whose wavelength for curing ranges from 185-400 nm. Afterwards, the coating was subjected to a post heat treatment of 85° C. for 15 minutes, to effect complete cure.

Table 7 illustrates the electrical properties taken before and after humidity (95% RH testing at 75° C. for 100 hours. The data is an average of five axial leaded film foil capacitor values. Compositions A through F gave good electrical values. These compositions are particularly effective in eliminating bubbles and pinholes often created by entrapped air in the end pour units.

EXAMPLE 3

Low Viscosity, UV Curable Potting System

The compositions in this example are highly suitable for use in applications involving potting and coating the same electrical components as in Example 2, e.g. axial leaded film foil capacitors, hybrid circuits, printed circuit boards, electrolytic capacitors, transformers, delay lines, resistors, etc. The compositions eliminate, or at least lessen the formation of, pin-holes and bubbles that often form in potting applications due to outgassing of entrapped air during the potting application. The resin system cures quickly forming an air tight seal, hence, preventing escape of air within the electrical and electronic package. Humidity resistance is a characteristic property for the composition of this example as well as its adhesion to aluminum, copper, gold, palladium, and silver.

The compositions A-F set forth in Table 8 are applied as in Example 2. Units that are end poured in this Example are axial leaded film foil cylindrical capacitors whose diameter ranged from 1.25 to 2.0 inches.

TABLE 8

| | End Pour Encapsulant Composition (% wt.) | | | | | |
|---|---|---|---|---|---|---|
| Materials | A | B | C | D | E | F |
| Prepolymer 1573 | 10 | 9 | 10 | 9 | 10 | 9 |
| Monomer | | | | | | |
| DCPA | 12 | 20.3 | 12 | 20.3 | 12 | 20.3 |
| HDODA | 14 | | 15 | | 14 | |
| TMPTA | | 10.5 | | 11.4 | | 10.5 |
| Photoinitiator IR-651 | 2.1 | 2.1 | 2.1 | 2.1 | 2.1 | 2.1 |
| Dispersant RE-610 | 1.0 | 0.9 | | | 1.0 | 0.9 |
| Filler | | | | | | |
| NYAD 325 | 58.9 | 55.2 | | | | |
| NYAD-325-10022 | | | 58.9 | 55.2 | 58.9 | 55.2 |
| Peroxide TBP | 2 | 2 | 2 | 2 | 2 | 2 |
| Viscosity (cps) | 1700 | 2000 | 2300 | 2500 | 1500 | 1800 |

TABLE 9

Electrical Properties
End Pour, "Mylar" Tape Wrapped Capacitors
Humidity at 75° C., 95% RH, for 100 hours

| | Initial Electrical Values | | | Final Electrical Values | | |
|---|---|---|---|---|---|---|
| Composition | CAP (uf) | DF (%) | ESR (ohm) | CAP (uf) | DF (%) | ESR (ohm) |
| A | 9.87 | .05 | .01 | 9.94 | .05 | .01 |
| B | 10.21 | .04 | .01 | 10.18 | .04 | .01 |
| C | 9.92 | .03 | .01 | 9.93 | .03 | .01 |
| D | 9.85 | .04 | .01 | 9.97 | .04 | .01 |
| E | 9.92 | .04 | .01 | 9.98 | .04 | .01 |
| F | 9.84 | .03 | .01 | 9.96 | .03 | .01 |

The resin compositions A-F of this example polymerize to a hard thermoset plastic within 6 seconds of exposure to actinic radiation within the wavelength range of 185-400 nm, from a mercury vapor lamp as earlier disclosed. A postheat treatment for 15 minutes at 85° C. was necessary to effect complete cure.

The coated film foil capacitor was subjected to operating temperatures between −55° to 105° C. for 1000 hours without delamination of the coating from the metallized surface. The pigmentation of the resin did not affect the cure properties of the coating, and did not significantly decrease cure speed.

Table 9 illustrates the electrical values for the said capacitor units after humidity (95% RH) testing at 75° C. for 100 hours. Measurements are an average of five film foil capacitor values. Compositions A through F gave good electrical values.

EXAMPLE 4

Low Viscosity, UV Curable Coating System for Electrical and Electronic Components The compositions of this example (compositions A-F set forth in Table 10) are useful for potting or casting electrical and electronic components and may be used in combination with the compositions of Example 3. The rapid cure of the composition in Example 3 allows application of this coating to a substrate that is free of bubbles and pin-holes, often generated during the potting process due to entrapped air within the electrical and electronic components.

The compositions of Example 4 are applied in a manner as described in Example 2. The end pour units of this example are cylindrical film foil axial leaded capacitors, with a diameter whose range is from 1.0 to 2.50 inches and a length whose range is from 1.25 to 2.0 inches.

TABLE 10

End Pour Encapsulant

| Materials | Composition (% wt.) | | | | | |
|---|---|---|---|---|---|---|
| | A | B | C | D | E | F |
| Prepolymer | | | | | | |
| 1573 | | 10 | | 10 | | 10 |
| 3600 | 9 | | 9 | | 9 | |
| Monomer | | | | | | |
| DCPA | 10.2 | 4 | 11.2 | 5.0 | 10.2 | 4 |
| TMPTA | 10.5 | 15 | 10.5 | 15 | 10.5 | 15 |
| Photoinitiator IR-651 | 2.1 | 2.1 | 2.1 | 2.1 | 2.1 | 2.1 |
| Dispersant RE-610 | 1.0 | | | 1.0 | 1.0 | |
| Pigment Dye | 1.2 | 1.2 | 1.2 | 1.2 | 1.2 | 1.2 |
| Flame Retardant | | | | | | |
| Oncor | 2 | 2 | 2 | 2 | 2 | 2 |
| DBDPO | 5.7 | 5.7 | 5.7 | 5.7 | 5.7 | 5.7 |
| Filler | | | | | | |
| NYAD-325 | 56.3 | 57 | | | | |
| NYAD-325-10022 | | | 56.3 | 57 | 56.3 | 57 |
| Peroxide TBP | 2 | 2 | 2 | 2 | 2 | 2 |
| Viscosity (cps) | 9100 | 13,200 | 10,000 | 14,100 | 8000 | 11,100 |

TABLE 11

Electrical Properties
End Pour, "Mylar" Tape Wrapped Capacitors
Humidity at 75° C., 95% RH, for 100 hours

| Composition | Initial Electrical Values | | | Final Electrical Values | | |
|---|---|---|---|---|---|---|
| | CAP (uf) | DF (%) | ESR (ohm) | CAP (uf) | DF (%) | ESR (ohm) |
| A | 9.42 | .05 | .01 | 9.63 | .05 | .01 |
| B | 9.32 | .05 | .01 | 9.52 | .05 | .01 |
| C | 8.22 | .04 | .01 | 8.32 | .04 | .01 |
| D | 8.18 | .06 | .01 | 8.26 | .06 | .01 |
| E | 8.20 | .07 | .01 | 8.29 | .07 | .01 |
| F | 9.61 | .05 | .01 | 9.73 | .05 | .01 |

These compositions cure within 6 seconds exposure to radiation from a mercury vapor lamp as disclosed in Example 1. A postheat treatment for 15 minutes at 85° C. is required to effect complete cure.

The said capacitors of Example 4 are humidity (95% RH) tested at 75° C. for 100 hours. The data illustrated in Table 11, is an average of five film foil capacitor values. Compositions A through F gave good electrical values for coating thicknesses that ranged from 0.010 to 0.090 inches.

The cured coatings exhibit uniform grafting to the polymer coating of Example 3, and good adhesion to metallic substrates.

In many cases, a satisfactory coating may be achieved without pre-coating the electrical and electronic components with the composition of Example 3.

EXAMPLE 5

Flame Retardant, UV Curable Conformal Coatings for Hybrid Circuits, Radial Film Foil Capacitors, and Ceramic Capacitors The compositions of this example (compositions A-C set forth in Table 12) are useful in coating hybrid circuits, radial film foil capacitors and ceramic capacitors due to their ability to withstand high humidity environments and temperature extremes from −55° to 125° C.

TABLE 12

Hybrid Circuit, Radial Film Foil Capacitor,
Ceramic Capacitor Encapsulant

| Materials | Composition (% wt.) | | |
|---|---|---|---|
| | A | B | C |
| Prepolymer 1173 | 8.5 | 6.3 | 7.6 |
| Monomer | | | |
| DCPA | 7.5 | 4.0 | 4.0 |
| TMPTA | 4.3 | 4.7 | 4.7 |
| Wetting Agent Fc-430 | 2 | 0.8 | 0.8 |
| Plasticizer L-722 | 3.5 | 3.0 | 3.0 |
| Photoinitiator | | | |
| IR-651 | 2.8 | 2.0 | 2.0 |
| ITX | | 2.0 | 2.0 |
| MK | | | 0.7 |
| EPB | | 2.0 | |
| Dispersant RE-610 | | 1.6 | 1.6 |
| Pigment Dye | 0.8 | 0.6 | 0.6 |
| Flame Retardant | | | |
| Oncor | 2 | 1.9 | 1.9 |
| DBDPO | 10.5 | 5.7 | 5.7 |
| Filler 400-NYAD-10024 | 52.6 | 64.3 | 64.3 |
| Bubble breaker Air Out | | 0.1 | 0.1 |
| Peroxide | | | |
| TBP | 5.5 | | |
| L231 | | 1.0 | 1.0 |

TABLE 13

Electrical Properties
Ceramic Capacitors
Humidity at 85° C., 95% RH, for 1000 hours

| Composition | Initial Electrical Values | | | Final Electrical Values | | |
|---|---|---|---|---|---|---|
| | CAP (uf) | DF (%) | ESR (ohm) | CAP (uf) | DF (%) | ESR (ohm) |
| A | 48.12 | 1.21 | 0.40 | 47.79 | 1.21 | 0.39 |
| B | 48.95 | 1.19 | 0.39 | 49.12 | 1.17 | 0.42 |
| C | 49.14 | 1.29 | 0.42 | 49.46 | 1.32 | 0.44 |

The electrical and electronic components, e.g., hybrid circuits, radial film foil capacitors, and ceramic capacitors, are dip-coated into the resin composition of Example 5, and curing is accomplished by exposing the electrical and electronic units to actinic radiation as described in Example 1, for 6 seconds. A second coating application is necessary to ensure complete electrical and electronic component coverage. After a second coating, the units are exposed to actinic radiation as previously described. The radiation cure is followed by a heat treatment in a convection oven at 85° C. for 15 minutes. The amount of rein used depends upon the configuration and size of the electrical and electronic component. Also, the resin thickness applied in each case depends upon the type of components surface mounted on the hybrid circuit, upon the type of attachment of lead wires to the ceramic capacitor and size of the ceramic capacitor and upon the size, and shape, and roughness of the radial film foil capacitor. Coating thicknesses vary anywhere from 0.010 to 0.225 inches per dipping application.

Electrical values for disc shaped ceramic capacitors o Example 5 are illustrated in Table 13. These measurements are an average of five ceramic capacitor values. Compositions A through F gave good electrical values after humidity (95% RH) testing at 85° C. for 1000 hours.

EXAMPLE 6

UV Curable Printing Ink for Heat Sensitive Substrate

An ink composition is prepared by combining the following Table 14 components in the amounts indicated in Table 14.

The viscosity of this composition is determined, in accordance with ASTM D115-82, to be 90,000 cps at 25° C.

The composition is printed onto polypropylene, mylar, and polystyrene (heat sensitive), in accordance with usual techniques, after which it is exposed to actinic radiation as previously described in Example 1, for 2 seconds.

These ink formulations are tested according to Military Standard 883C and all inks pass.

TABLE 14

Ink Formulations for Heat Sensitive Substrates

| Material | Composition (% wt.) | | | | | |
|---|---|---|---|---|---|---|
|  | A | B | C | D | E | F |
| Prepolymer 1570 | 50 | 50 | 50 | 50 | 50 | 40 |
| Dispersant Re-610 | 0.01 | 0.04 | 0.04 | 0.04 | 0.04 | 0.04 |
| Monomer TMPTA | 32.96 | 32.96 | 32.96 | 32.96 | 32.96 | 32.6 |
| Photoinitiator |  |  |  |  |  |  |
| IR-651 | 6 | 6 | 6 | 6 | 6 |  |
| Lucirin LR8728 |  |  |  |  |  | 0.5 |
| ITX | 2.5 | 2.5 | 2.5 | 2.5 | 2.5 |  |
| BP |  |  |  |  |  | 1.5 |
| DMAEA | 3.5 | 3.5 | 3.5 | 3.5 | 3.5 | 2.0 |
| Thixotropic agent Cab-o-sil | 3 | 3 | 3 | 3 | 3 | 3.0 |
| Pigment |  |  |  |  |  |  |
| Black F2302 | 2 |  |  |  |  |  |
| Blue F5203 |  | 2 |  |  |  |  |
| Green |  |  | 2 |  |  |  |
| Brown |  |  |  | 2 |  |  |
| Yellow |  |  |  |  | 2 |  |
| TiO2 |  |  |  |  |  | 10 |
| ZnS |  |  |  |  |  | 10 |

Chemical Names and Availability of Certain Table 14 and 15 Components

| Black-F2302 | Ferro Cclor Corp. | Composition of CrCuMnMo |
| Blue-F5203 | Ferro Cclor Corp. | Composition of CoCrAl |
| Green-V7687 | Ferro Cclor Corp. | Composition of CrCoMgAl |

-continued

Chemical Names and Availability of Certain Table 14 and 15 Components

| Brown-F6114 | Ferro Cclor Corp. | Composition of CrFeSi |
| Yellow-V9400 | Ferro Cclor Corp. | Composition of NiSbTi |
| TiO2 | Du Pont | titanium dioxide |
| ZnS | Aceto Chemical | zinc sulfide |
| Lucirin LR8728 | BASF | 2,4,6 trimethyl-benzoyldiphenyl-phosphine oxide |
| Cab-o-sil | Cabot | fumed silica |
| DMAEA | CPS Chemical Co. | dimethylamino-ethyl acrylate |
| ITX | Ward/Blenkinsnop | isopropyl-thixanthone |

EXAMPLE 7

UV Curable Composition for Non-Heat Sensitive Substrates

A further ink competition is prepared for non-heat sensitive substrates by mixing together the following Table 15 components illustrated in Table 15.

TABLE 15

Ink Formulations for Non-Heat Sensitive Substrates

| Material | Compositions (% wt.) | | | | |
|---|---|---|---|---|---|
|  | A | B | C | D | E |
| Prepolymer 1570 | 45 | 45 | 45 | 45 | 45 |
| Dispersent RE-610 | 0.1 | 0.1 | 0.1 | 0.1 | 0.1 |
| Monomer TMPTA | 34.9 | 34.9 | 34.9 | 34.9 | 34.9 |
| Photoinitiator |  |  |  |  |  |
| IR-651 | 6 | 6 | 6 | 6 | 6 |
| ITX | 2.5 | 2.5 | 2.5 | 2.5 | 2.5 |
| DMAEA | 3.5 | 3.5 | 3.5 | 3.5 | 3.5 |
| Thixotropic agent Cab-o-sil | 3 | 3 | 3 | 3 | 3 |
| Pigment |  |  |  |  |  |
| Black | 5 |  |  |  |  |
| Blue |  | 5 |  |  |  |
| Green |  |  | 5 |  |  |
| Brown |  |  |  | 5 |  |
| Yellow |  |  |  |  | 5 |

These compositions, which had a viscosity of 90,000 cps at 25° C., are printed onto an aluminum can and cured as in the previous example for 8 seconds. The ink compositions exhibit properties comparable to those of the previous example.

It will now be apparent to those skilled in the art that other embodiments, improvements, details, and uses can be made consistent with the letter and spirit of the foregoing disclosure and within the scope of this patent, which is limited only by the following claims, construed in accordance with the patent law, including the doctrine of equivalents.

What is claimed is:

1. Actinic radiation curable composition suitable for use in coating electronic components and as a printing ink comprising:
   (a) a prepolymer selected from the group consisting of monofunctional vinyl resins and multifunctional vinyl resins;
   (b) a monomer selected from the group consisting of monofunctional vinyl monomers and multifunctional vinyl monomers;

(c) a photoinitiator;
(d) at least one filler; and
(e) at least one surface active agent having a molecular weight greater than about 227;

wherein one of the surface active agent or the filler has an overall pH greater than or equal to 7 and the other of the surface active agent or the filler has an overall pH less than or equal to 7 whereby the overall pH of the surface active agent(s) is less than 7 when the overall pH of the filler(s) is greater than 7, such that dispersion of the filler in the composition is enhanced and wherein the volume % of filler is at least 60 based on the competition of a prepolymer, a monomer, a photoinitiator, a surface active and a filler.

2. Actinic radiation curable composition according to claim 1 wherein the prepolymer is an aromatic epoxy acrylate.

3. Actinic radiation curable composition according to claim 2 wherein the aromatic epoxy acrylate is a diacrylate ester of bisphenol A epoxy.

4. Actinic radiation curable composition according to claim 1 wherein the monomer is trimethylol propane triacrylate and or 1,6 hexanediol diacrylate.

5. Actinic radiation curable composition according to claim 1 wherein the monomer is dicyclopentenyl acrylate.

6. Actinic radiation curable composition according to claim 1 wherein the photoinitiator is selected from the group of 2 isopropyl-thioxanthone, 2-2 dimethoxy 2, phenylacetophenone, 2 hydroxy 2 methyl 1 phenyl propan-1-one.

7. Actinic radiation curable composition according to claim 1 wherein the filler is calcium metasilicate.

8. Aticnic radiation curable composition according to claim 1 wherein the composition contains two surface active agents.

9. Actinic radiation curable composition according to claim 8 wherein one surface active agent is an organic phosphate ester.

10. Actinic radiation curable composition according to claim 1 wherein the filler used has been precoated with a surface active agent.

11. Actinic radiation curable composition according to claim 10 wherein the precoated filler is calcium metasilicate and the surface active agent is a silane.

12. Actinic radiation curable composition according to claim 11 wherein the silane is methacryloxypropyltrimethoxysilane.

13. Actinic radiation curable composition according to claim 12 wherein the said at least one surface active agent comprises an organic phosphate acid ester.

14. Actinic radiation curable composition according to claim 13 wherein the organic phosphate acid ester is selected from the group of nonyl nonoxynol-7-phosphate, nonyl nonoxynol-10-phosphate, nonyl nonoxynol-15-phosphate, nonoxynol-9-phosphate, nonoxynol-4-phosphate, trideceth-6-phosphate, trideceth4-phosphate, trideceth-7-phosphate, polyoxyethylene lauryl ether phosphate, polyoxyethylene phenyl ether phosphate, isoamyl alcohol ethoxylated phosphate, polyoxyethylene butoxyethyl ether phosphate, polyoxyethylene hexyl ether phosphate.

15. Actinic radiation curable composition according to claim 1 wherein the said at least one surface active agent is selected from the group of fish oil, linoleic acid, oleic acid, palmitic acid, stearic acid, carboxylic acids, oleoyl acids and titanates.

16. Actinic radiation curable composition according to claim 1 wherein the composition further comprises a flame retardant component.

17. Actinic radiation curable composition according to claim 1 wherein the composition further comprises an inhibitor component.

18. Actinic radiation curable composition according to claim 1 wherein the composition further includes a thixotropic agent.

19. Actinic radiation curable composition according to claim 18 wherein the thixotropic agent is fumed silica.

20. An electric component coated with a composition according to the composition of claim 1.

21. Actinic radiation curable composition according to claim 1 wherein the monofunctional vinyl monomer is selected from the group of monofunctional alpha, beta unsaturated carboxy monomers and wherein the multifunctional vinyl monomers are selected from the group of multifunctional alpha, beta unsaturated carboxy monomers.

22. Actinic radiation curable composition according to claim 1 wherein the prepolymer is between about 0 and about 70% by weight, the monomer is between about 1 and about 70% by weight, the photoinitiator is between about 1 and about 15 % by weight, and the surface active agent is between about 0.5 and about 4% by weight of the composition.

23. Actinic radiation curable composition according to claim 1 wherein the prepolymer is between about 3 and about 20% by weight, the monomer is between about 2 and about 6by weight, and the surface active agent is between about 0.5 and about 4% by weight of the composition.

24. Improved composition capable of being UV cured and suitable for use as a printing ink comprising:
(a) a prepolymer selected from the group consisting of monofunctional vinyl ester resins and multifunctional ester resins;
(b) a monomer selected from the group consisting of monofunctional vinyl ester monomers selected from the group consisting of acrylate and methacrylate monomers and multifunctional vinyl ester monomers selected from the group consisting of arylate and methacrylate monomers;
(c) a photoinitiator;
(d) at least one pigment; and
(e) at least one surface active agent having a molecular weight greater than about 227;

wherein one of the surface active agent or the pigment has an overall pH greater than or equal to 7 and the other of the surface active agent or pigment has whereby the overall pH of the surface active agent(s) is less than 7 when the overall pH of the pigment(s) is greater than 7, an overall pH less than or equal to 7 and wherein the volume % of pigment is at least 60 based on the competition of a prepolymer, a monomer, a photoinitiator, a surface active and a pigment.

* * * * *